United States Patent
Cirne et al.

(10) Patent No.: US 9,064,041 B1
(45) Date of Patent: *Jun. 23, 2015

(54) SIMPLE METHOD OPTIMIZATION

(71) Applicant: CA, Inc., Islandia, NY (US)

(72) Inventors: Lewis K. Cirne, Redwood City, CA (US); John B. Bley, Durham, NC (US); Daryl L. Puryear, San Mateo, CA (US)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,761

(22) Filed: Apr. 8, 2013

Related U.S. Application Data (63) Continuation of application No. 10/700,338, filed on Nov. 3, 2003, now Pat. No. 8,418,145.

(60) Provisional application No. 60/424,745, filed on Nov. 7, 2002.

(51) Int. Cl.
*G06F 9/44* (2006.01)
*G06F 11/34* (2006.01)
*G06F 11/36* (2006.01)

(52) U.S. Cl.
CPC ........ *G06F 11/3466* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 5,539,907 A * | 7/1996 | Srivastava et al. | 717/130 |
| 5,655,081 A | 8/1997 | Bonnell et al. | |
| 5,732,273 A * | 3/1998 | Srivastava et al. | 717/128 |
| 5,790,858 A * | 8/1998 | Vogel | 717/130 |
| 5,892,949 A * | 4/1999 | Noble | 717/125 |
| 5,896,536 A | 4/1999 | Lindsey | |
| 5,898,873 A | 4/1999 | Lehr | |
| 5,960,198 A * | 9/1999 | Roediger et al. | 717/130 |
| 5,963,740 A * | 10/1999 | Srivastava et al. | 717/130 |
| 5,978,594 A | 11/1999 | Bonnell et al. | |
| 6,026,234 A * | 2/2000 | Hanson et al. | 717/133 |
| 6,139,198 A | 10/2000 | Danforth et al. | |
| 6,332,212 B1 | 12/2001 | Organ et al. | |
| 6,351,843 B1 | 2/2002 | Berkley et al. | |
| 6,353,924 B1 * | 3/2002 | Ayers et al. | 717/128 |
| 6,643,842 B2 | 11/2003 | Angel et al. | |
| 6,651,243 B1 * | 11/2003 | Berry et al. | 717/130 |

(Continued)

OTHER PUBLICATIONS

Jeff Friesen, Java 2 by Example, Second Edition, published by Que, Dec. 14, 2001 ISBN: 0-7897-2593-2, pp. 114-117, 124-125 and 242-245, 16 pages.

(Continued)

*Primary Examiner* — Tuan Q. Dam
*Assistant Examiner* — Zheng Wei
(74) *Attorney, Agent, or Firm* — Vierra Magen Marcus LLP (57) ABSTRACT

Methods are classified as simple or complex. Complex methods are modified to add a tracer. Methods classified as simple are not modified to add a tracer. There are many different standards that can be used within the spirit of the present invention to classify methods as simple or complex. In one embodiment, a method is complex if it meets three criteria: (1) the method has an access level of public or package; (2) the method is non-synthetic and (3) the method calls at least one other method. Methods that do not satisfy all three criteria are classified as simple methods. In other embodiments, a method can be classified as complex if it satisfies two of the above criteria, or other similar criteria.

20 Claims, 5 Drawing Sheets

(56) References Cited

U.S. PATENT DOCUMENTS

| | | | |
|---|---|---|---|
| 6,662,359 B1* | 12/2003 | Berry et al. | 717/130 |
| 6,738,965 B1 | 5/2004 | Webster | |
| 6,760,903 B1 | 7/2004 | Morshed et al. | |
| 6,802,054 B2 | 10/2004 | Faraj | |
| 6,925,638 B1* | 8/2005 | Koved et al. | 717/155 |
| 7,103,878 B2* | 9/2006 | Fahs et al. | 717/130 |
| 7,171,654 B2 | 1/2007 | Werme et al. | |
| 7,240,335 B2 | 7/2007 | Angel et al. | |
| 7,281,242 B2 | 10/2007 | Inamdar | |
| 7,461,369 B2* | 12/2008 | Zhao et al. | 717/131 |
| 7,512,935 B1 | 3/2009 | Cobb | |
| 7,962,905 B2 | 6/2011 | Inamdar | |
| 8,312,435 B2* | 11/2012 | Wygodny et al. | 717/130 |
| 2002/0066081 A1 | 5/2002 | Duesterwald et al. | |
| 2002/0108102 A1 | 8/2002 | Muhlestein et al. | |
| 2002/0199172 A1 | 12/2002 | Bunnell | |
| 2003/0088854 A1* | 5/2003 | Wygodny et al. | 717/130 |
| 2003/0145309 A1 | 7/2003 | Inamdar | |
| 2004/0031020 A1* | 2/2004 | Berry et al. | 717/130 |
| 2004/0133882 A1* | 7/2004 | Angel et al. | 717/130 |
| 2005/0005266 A1* | 1/2005 | Datig | 717/136 |
| 2009/0172638 A1 | 7/2009 | Cobb | |
| 2010/0088683 A1 | 4/2010 | Golender et al. | |

OTHER PUBLICATIONS

Grove et al., Call Graph Construction in Object-Oriented Languages, published 1997, by ACM, p. 108-124, 17 pages.

Grove et al., A Framework for Call Graph Construction Algorithms, published 2001 by ACm Col.23, No. 6, p. 685-746, 62 pages.

Office Action dated Jan. 3, 2007, U.S. Appl. No. 10/700,338, filed Nov. 3, 2003, 25 pages.

Response to Office Action dated Apr. 23, 2001, U.S. Appl. No. 10/700,338, filed Nov. 3, 2003, 14 pages.

Final Office Action dated Jul. 12, 2007, U.S. Appl. No. 10/700,338, filed Nov. 3, 2003, 23 pages.

Response to Final Office Action dated Sep. 5, 2007, U.S. Appl. No. 10/700,338, filed Nov. 3, 2003, 15 pages.

Office Action dated Jul. 15, 2008, U.S. Appl. No. 10/700,338, filed Nov. 3, 2003, 28 pages.

Response to Office Action dated Nov. 11, 2008, U.S. Appl. No. 10/700,338, filed Nov. 3, 2003, 19 pages.

Office Action dated Mar. 5, 2009, U.S. Appl. No. 10/700,338, filed Nov. 3, 2003, 25 pages.

Response to Office Action dated Jun. 3, 2009, U.S. Appl. No. 10/700,338, filed Nov. 3, 2003, 30 pages.

Final Office Action dated Sep. 17, 2009, U.S. Appl. No. 10/700,338, filed Nov. 3, 2003, 28 pages.

Response to Final Office Action dated Dec. 17, 2009, U.S. Appl. No. 10/700,338, filed Nov. 3, 2003, 18 pages.

Office Action dated Sep. 13, 2011, U.S. Appl. No. 10/700,338, filed Nov. 3, 2003, 31 pages.

Response to Office Action dated Dec. 9, 2011, U.S. Appl. No. 10/700,338, filed Nov. 3, 2003, 28 pages.

Final Office Action dated Mar. 9, 2012, U.S. Appl. No. 10/700,338, filed Nov. 3, 2003, 27 pages.

Notice of Allowance and Issue Fee(s) Due dated Dec. 11, 2012, U.S. Appl. No. 10/700,338, filed Nov. 3, 2003, 12 pages.

* cited by examiner

```
Class FirstClass
    public M1 ()
        {
        ...M2();
        ...M3();
        } public M2 ()
        {
        ...
        } public M3 ()
        {
        ...M4();
        ...M5();
        } public M4 ()
        {
        ...
        } public M5 ()
        {
        ...
        } public M6 ()
        {
        ...
        } public M7 ()
        {
        ...M8();
        } public M8 ()
        {
        ...
        }
```

SIMPLE METHOD OPTIMIZATION

CLAIM OF PRIORITY

This application is a continuation of U.S. patent application Ser. No. 10/700,338, entitled "Simple Method Optimization," filed on Nov. 3, 2003, published as US 2004/0230956 on Nov. 18, 2004 and issued as U.S. Pat. No. 8,418,145 on Apr. 9, 2013, which claims the benefit of U.S. Provisional Application No. 60/424,745 entitled, "Simple Method Agent Optimization," filed on Nov. 7, 2002, which are incorporated herein by reference in their entireties.

BACKGROUND OF THE INVENTION

1. Field of the Invention

The present invention is directed to technology for monitoring applications.

2. Description of the Related Art

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live web applications and web sites to make sure that they are running properly.

One means for monitoring live web applications includes the use of a performance analysis tool. Performance analysis tools are used to debug software and to analyze an application's run time execution. Many performance analysis tools provide timing data on how long each method (or procedure or other process) is being executed, report how many times each method is executed and/or identify the function call architecture. Some of the tools provide their results in text files or on a monitor. Other tools graphically display their results.

One problem with existing performance analysis tools is that they provide too much data so that the user of the tool is overwhelmed. The user of a performance analysis tool has the difficult task of analyzing the multitude of data to determine which data is relevant and which data is not relevant (e.g. redundant or otherwise not useful). Once the user determines which data is relevant, the user can then analyze the relevant data to learn about the software being monitored.

Another problem with existing performance analysis tools is that they require too much overhead. Many performance analysis tools will instrument existing source code or object code to add the functionality of the performance analysis tool. For example, a performance analysis tool monitoring a Java application may instrument a large number of methods in the software in order to be able to analyze the performance of each method. However, modifying a large number of methods may add an enormous amount of code to the software and may impact performance of the underlying software.

SUMMARY OF THE INVENTION

The present invention, roughly described, pertains to technology for monitoring applications. In one embodiment, methods are classified as simple or complex. Complex methods are modified to add a tracer. Methods classified as simple are not modified to add a tracer. There are many different standards that can be used within the spirit of the present invention to classify methods as simple or complex. In one example, a method is complex if it meets three criteria: (1) the method has an access level of public or package; (2) the method is non-synthetic and (3) the method calls at least one other method. Methods that do not satisfy all three criteria are classified as simple methods.

One implementation of the present invention includes accessing a method, determining whether the accessed method is complex and modifying the method for a particular purpose only if the method is complex. Another implementation of the present invention includes determining which methods of a set of methods are complex and using a first tracing mechanism for the methods determined to be complex without using the first tracing mechanism for methods not determined to be complex. An example of an appropriate tracing mechanism is a timer. The timer can be used to determine how long a method took to complete. Other tracers may count how many times a method is called, how many instances of a method are running, how many instances failed, how many instances were successful, etc. There are many different types of tracers that can utilize the present invention.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing device) and/or communication interfaces (e.g. network cards, wireless transmitter/receivers, etc.). The processors are used to perform the processes described herein.

These and other objects and advantages of the present invention will appear more clearly from the following description in which the preferred embodiment of the invention has been set forth in conjunction with the drawings.

DETAILED DESCRIPTION

One implementation of the present invention operates on Java code. For example purposes, the remaining portions of this document provide examples using Java code. However, the present invention applies to other programming languages and formats as well. Furthermore, the examples herein make use of the term "method," which has a specific meaning in reference to the Java programming language. For purposes of this document, "method" includes a Java method as well as other sets of instructions such as procedures, functions, routines, subroutines, sequences, processes, etc.

One embodiment of the present invention is used as part of an application performance analysis tool that monitors performance of an application. In one embodiment, the application performance analysis tool accomplishes its task by modifying the application's object code (also called bytecode).

Object code can be generated by a compiler or an assembler. Alternatively, object code can be generated manually. Object code can be machine executable or suitable for processing to produce executable machine code. Modifying object code includes adding new instructions to the object code and/or modifying existing portions of the object code. Modifying object code typically does not involve accessing the source code. An example of modifying object code can be found in U.S. Pat. No. 6,260,187 "System For Modifying Object Oriented Code" by Lewis K. Cirne, incorporated herein by reference in its entirety.

Figure 1:
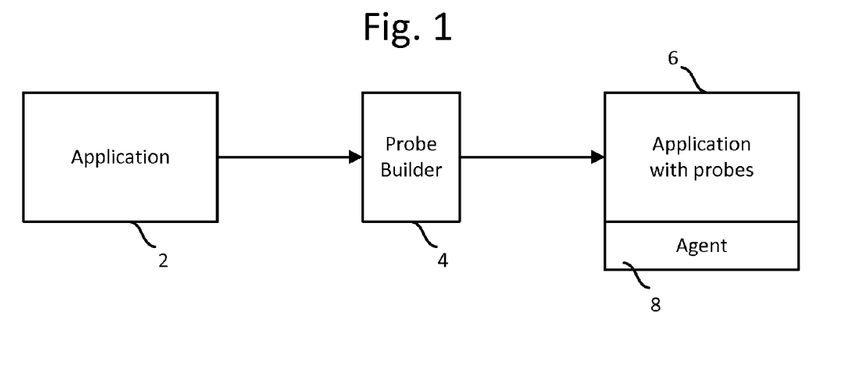
FIG. 1 is a block diagram depicting how object code for an application can be modified.

FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the Java application before the probes are added. In embodiments that use programming languages other than Java, Application 2 can be a different type of application.

Probe Builder 4 modifies the byte code for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the Java application is referred to as a managed application.

One embodiment of a performance analysis tool modifies object code by adding new code that activates a tracing mechanism (e.g. timer) when a method of concern starts and terminates the tracing mechanism when the method completes. In one implementation, new functionality is added to a method such that all or part of the new functionality is executed upon exit from the method. Rather than add many copies of the exit code in different places, the tool adds exit code using "Try" and "Finally" functionality. To better explain this concept consider the following example pseudo code for a method called "exampleMethod." This method receives an integer parameter, adds 1 to the integer parameter, and returns the sum:

```
public int
exampleMethod(int x)
{
    return x+1;
}
```

One embodiment of a performance analysis tool will modify this code, conceptually, by including a call to a tracer method, grouping the original instructions from the method in a "Try" block and adding a "Finally" block with code that stops the tracer:

```
public int
exampleMethod(int x)
{
    IMethodTracer tracer = AMethodTracer.loadTracer(
        "com.wily.introscope.agent.trace.MethodTimer",
        this,
        "com.wily.example.ExampleApp",
        "exampleMethod",
        "name=Example Stat");
    try {
        return x + 1;
    } finally {
        tracer.finishTrace( );
    }
}
```

In the above example, IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer (e.g. a timer), perform error handling and perform setup for starting the tracer. The actual tracer is started by the method doStartTrace, which is called by startTrace. The method finishTrace is called to stop the tracer and perform error handling. The method finishTrace calls doFinishTrace to actually stop the tracer. Within AMethodTracer, startTrace and finishTracer are final and void methods; and doStartTrace and doFinishTrace are protected, abstract and void methods. Thus, the methods doStartTrace and doFinishTrace must be implemented in subclasses of AMethodTracer. Each of the subclasses of AMethodTracer implement the actual tracers. The method loadTracer is a static method that calls startTrace and includes five parameters. The first parameter, "com.wily.introscope . . . ." is the name of the class that is intended to be instantiated that implements the tracer. The second parameter, "this" is the object being traced. The third parameter "com.wily.example . . . " is the name of the class that the current instruction is inside of. The fourth parameter, "exampleMethod" is the name of the method the current instruction is inside of. The fifth parameter, "name= . . . " is the name to record the statistics under. The original instruction (return x+1) is placed inside a "Try" block. The code for stopping the tracer (a call to tracer.finishTrace) is put within the Finally block.

The above example shows source code being modified. In one embodiment, the present invention doesn't actually modify source code. Rather, the present invention modifies object code. The source code examples above are used for illustration to explain the concept of the present invention. The object code is modified conceptually in the same manner that source code modifications are explained above. That is, the object code is modified to add the functionality of the "Try" block and "Finally" block. More information about such object code modification can be found in U.S. patent application Ser. No. 09/795,901, "Adding Functionality To Existing Code At Exits," filed on Feb. 28, 2001 and issued as U.S. Pat. No. 7,512,935 on Mar. 31, 2009, incorporated herein by reference in its entirety. In another embodiment, the source code can be modified.

Figure 2:
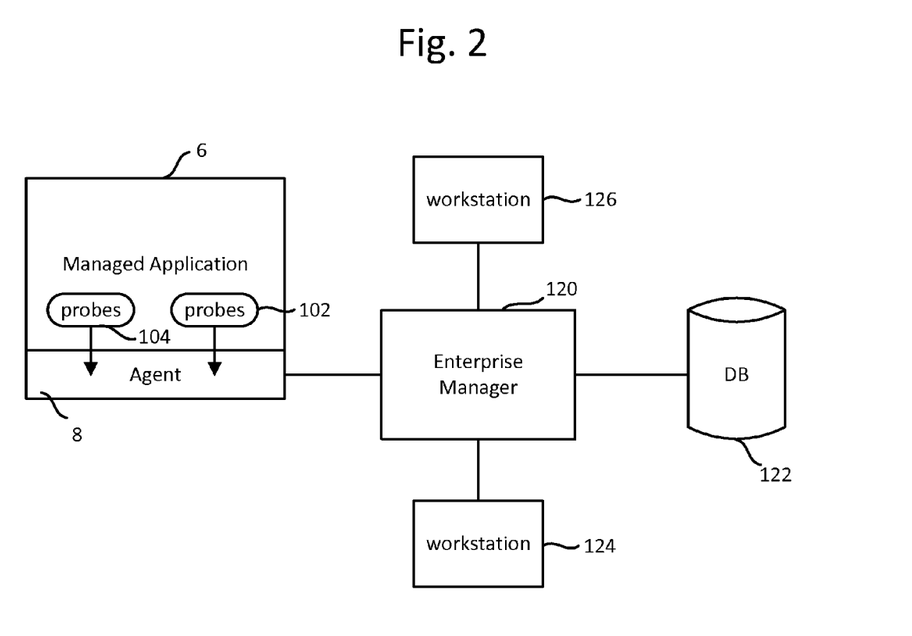
FIG. 2 is a block diagram of a system for monitoring an application. This system represents one example of a system that can implement the present invention.

FIG. 2 is a conceptual view of the components of one example of an application performance analysis tool. In addition to managed Application 6 with probes 102 and 104, FIG. 2 also depicts Enterprise Manager 120, database 122, workstation 124 and workstation 126. As a managed application runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way.

In one embodiment of the system, each of the components is running on different machines. That is, workstation 126 is on a first computing device, workstation 124 is on a second computing device, Enterprise Manager 120 is on a third computing device, managed Application 6 is running on a fourth computing device and Probe Builder 4 is running on a fifth computing device. In another embodiment, two or more of the components are operating on the same computing device. For example, managed application 6 and Agent 8 may be on a first computing device, Enterprise Manager 120 on a second computing device and a workstation on a third computing device. Alternatively, all of the components can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

In one embodiment, the object code that is being modified is stored in a class data structure according to the Java Virtual Machine Specification. More information about the class data structure can be found in The Java Virtual Machine Specification, Second Edition, by Tim Lindholm and Frank Yellin, Addison-Wesley, 1999; and U.S. patent application Ser. No. 09/795,901, "Adding Functionality To Existing Code at Exits," filed on Feb. 28, 2001 and issued as U.S. Pat. No. 7,512,935 on Mar. 31, 2009; both of which are incorporated herein by reference in their entirety.

Figure 3:
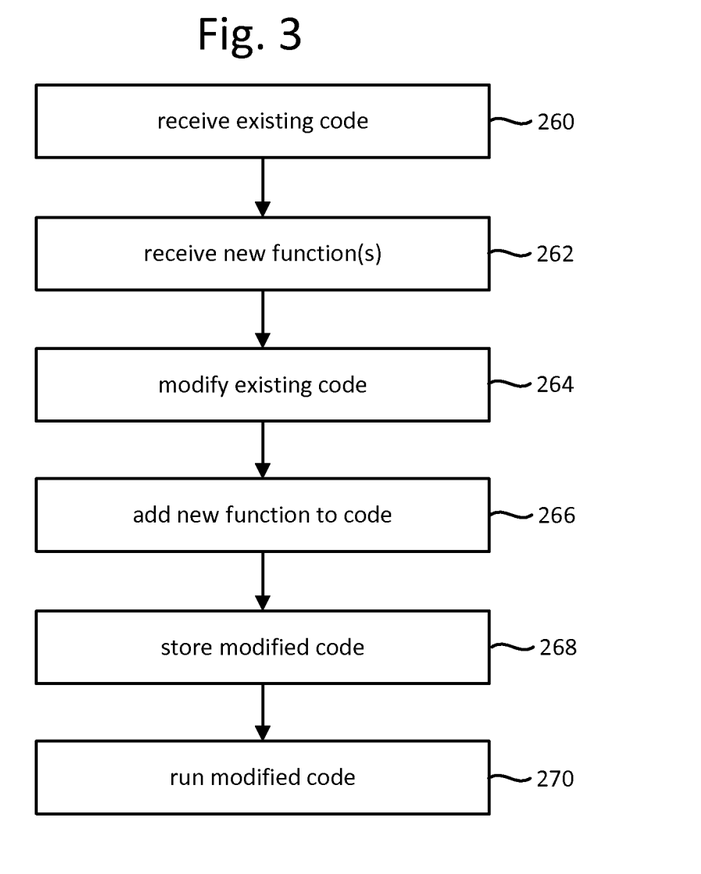
FIG. 3 is a flow chart describing one embodiment of the process of modifying existing object code.

FIG. 3 is a flowchart describing one embodiment of a process of modifying the existing object code. In step 260, Probe Builder 4 receives the existing object code. In step 262, Probe Builder 4 receives the new functionality, which can be new classes and methods that allow for monitoring the application. In some embodiments, the new classes and methods can be in the form of a library. In step 264, the existing code is edited. In step 266, all or part of the new functionality (e.g. the new classes/methods) is added to, combined with, or associated with the existing code. In step 268, the modified code (which includes the new functionality) is stored. In step 270, the modified code is run. In one embodiment, step 270 includes running the application as depicted in FIG. 2. In embodiments that use environments other than a performance analysis tool, step 270 includes executing in those other environments. The present invention is not limited to use with a performance management tool.

The present invention seeks to improve the process for modifying existing code to add functionality in order to reduce overhead and reduce the amount of data generated, without losing important data. Consider the following pseudo code:

Class TestClass
   public methodNumberOne( )
   {
   ...
   call to methodNumberTwo( );
   ...
   }
   public methodNumberTwo( )
   {
   ... [no calls to other methods]
   }

Previous tools would instrument both methodNumberOne( ) and methodNumberTwo( ). However, tracing (e.g. timing) methodNumberTwo( ) may be redundant and/or not interesting to a debugger or performance analyzer. Since methodNumberOne( ) calls methodNumberTwo( ) and methodNumberTwo( ) does not call any other methods, tracing methodNumberOne( ) will provide all the information needed and tracing methodNumberTwo( ) may not provide the user of the tool with significant meaningful data. That is, an analyzer of the performance of the software will not need the granularity of tracing methodNumberTwo( ). Knowing the information about the performance of methodNumberOne( ), which includes performing methodNumberTwo( ), is sufficient for many analyzers. Thus, one embodiment of the present invention seeks to improve the analysis by tracing methodNumberOne( ) and not explicitly tracing methodNumberTwo( ).

Figure 4:
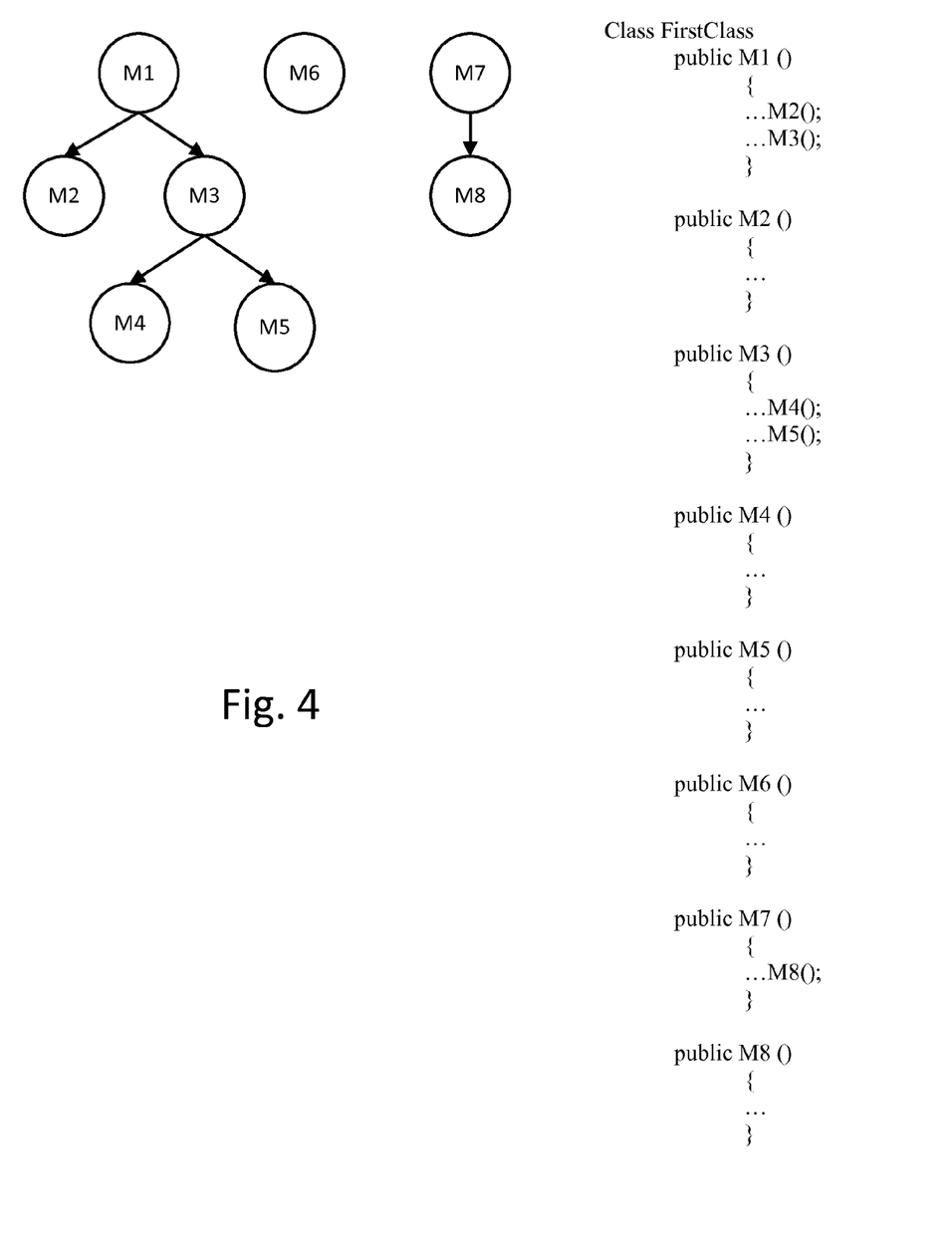
FIG. 4 depicts pseudo code and a call graph for the pseudo code.

Many object classes are likely to have many methods. The pseudo code of FIG. 4 for FirstClass includes 8 methods M1, M2, M3, M4, M5, M6, M7 and M8. Some of the methods call other methods and some of the methods do not call other methods. FIG. 4 also depicts a call graph that depicts how the various method call other methods. For example, the method M1 calls M2 and M3. The method M3 calls M4 and M5. M1 is at the top of the call graph because it calls other methods, but it is not called by other methods in the class. M2 and M3 are in the middle of the call graph because they call other methods and are called by other methods. M4 and M5 are at the bottom of the call graph because the are called by other methods and do not call other methods. M6 is does not call any method. However, M6 is at the top of the call graph because M6 is not called by any other methods in the class. M7 is at the top of the call graph because M7 is not called by any other methods in the class. M7 does, however, call M8. M8 is at the bottom of the call graph because M8 does not call other methods.

In one embodiment of the present invention, the system will only modify those methods that are at the top of the call graph. Thus, only those methods that are at the top of the call graph will be traced (e.g. timed).

Determining which methods are at the top of the call graph can, in some situations, be very difficult. Thus, another embodiment of the present invention determines which methods to modify in order to add a tracer by first classifying methods as simple or complex. Methods classified as simple are not modified to add a tracer. Complex methods are modified to add a tracer.

There are many different standards that can be used within the spirit of the present invention to classify methods as simple or complex. In one embodiment, a method is complex if it meets three criteria: (1) the method has an access level of public or package; (2) the method is non-synthetic and (3) the method calls at least one other method. Methods that do not satisfy all three criteria are classified as simple methods. In other embodiments, a method can be classified as complex if it satisfies two of the above criteria, or other similar criteria.

Java provides for four levels of access control for methods: public, private, protected, and package. Private is the most restrictive access level. A private method can only be accessed by methods in the same class. A protected method can be accessed by other methods in the same class, sub classes and classes in the same package. A public method can be accessed by any class of any parentage in any package. The package access level is the default and allows a method to be accessed by classes in the same package, regardless of their parentage.

A synthetic method is a method that does not appear in the source code. For example, during compilation, the compiler may add one or more methods. Typically, the compiler explicitly makes it easy to see that methods are or are not synthetic. For example, during compilation, the compiler may add one or more methods, such as utility methods for accessing runtime information. Java compilers flag these methods with the "Synthetic" attribute.

Consider the following example:

```
Class ExampleClass
   public methodOne( )
   {
      ...
      call to methodTwo( );
      ...
   }
   public methodTwo( )
   {
      ... [no calls to other methods]
   }
   private methodThree( )
   {
      ...
      call to methodTwo( );
      ...
   }
   methodFour( )
   {
      ...
      call to methodTwo( );
      call to methodOne( );
   }
```

In the above example, methodOne( ) and methodFour( ) are complex methods that will be modified to add a tracer. MethodOne( ) is a public method that calls methodTwo( ). MethodFour( ) is a package method that calls methodTwo( ) and methodOne( ). Neither methodOne( ) nor methodFour( ) are synthetic. MethodTwo( ) is simple because it does not call any other methods. MethodThree( ) is simple because it is private. MethodTwo( ) and methodThree( ) will not be modified to add a tracer.

Figure 5:
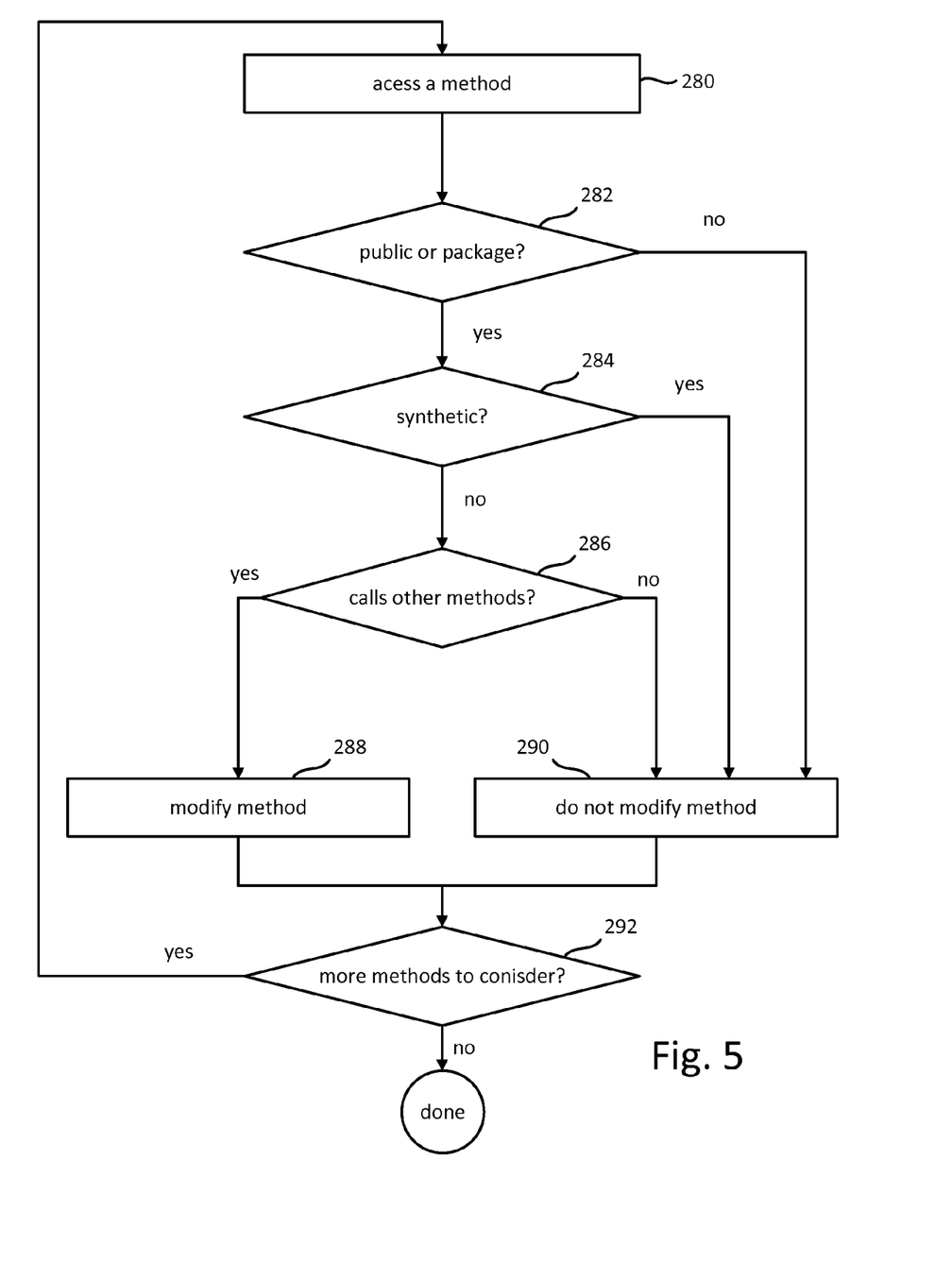
FIG. 5 is a flow chart describing one embodiment of the process performed when modifying existing object code.

FIG. 5 is a flow chart describing one embodiment of a process for performing step 264 of FIG. 3. As part of the process of FIG. 5, the various methods are accessed and determined to be either complex or simple, as discussed above. If the method is complex, it is modified as described herein. If the method is determined to be simple, it is not modified for the purposes that the complex methods are modified.

In step 280 of FIG. 5 a method is accessed from the set of methods that are to be considered. In step 282, it is determined whether the method has an access level of public or package access level. If the method does not have an access level of public or package, then that method is not modified for the purposes that the complex methods are modified (step 290). If the method has an access level of public or package, then in step 284 it is determined whether the method is synthetic. If the method is synthetic, then that method is not modified for the purposes that the complex methods are modified (step 290). If the method is not synthetic, then in step 286 it is determined whether the method calls any other methods. If the method under consideration does not call any other methods, then that method is not modified for the purposes that the complex methods are modified (step 290). If the method under consideration does call one or more other methods, then the method under consideration is modified to add the tracer in step 288. After steps 288 and 290, the process determines whether there are more methods to consider in step 292. If the are more methods to consider, then the process of FIG. 5 continues at step 280. If the are no more methods to consider, then the process of FIG. 5 is finished.

Figure 6:
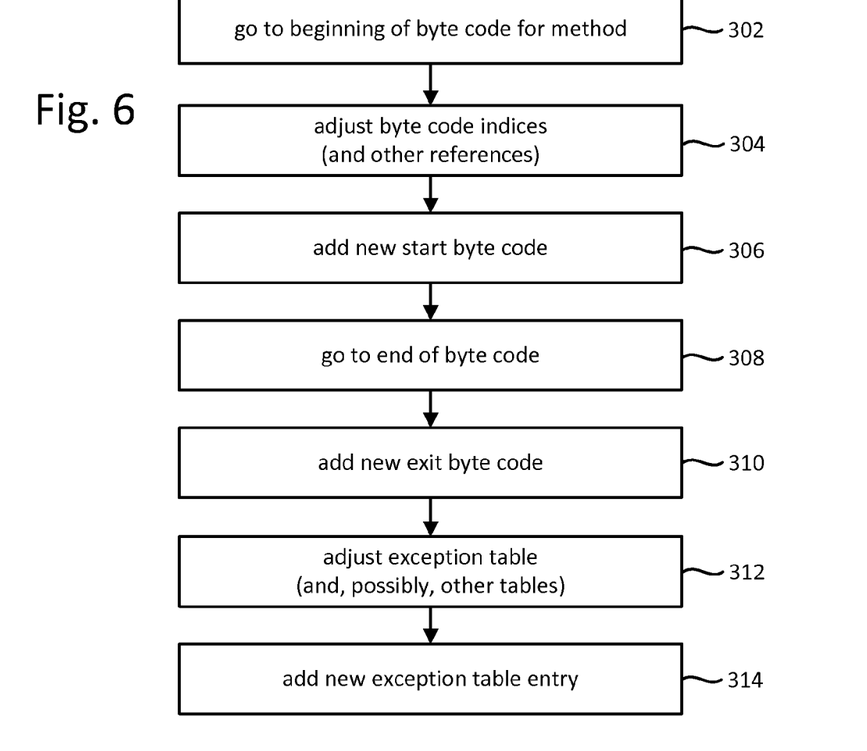
FIG. 6 is a flow chart describing one embodiment of the process of modifying a method.

FIG. 6 is a flowchart describing the process of modifying the existing object code (step 288 of FIG. 5). The process of FIG. 6 is performed for one method and would be repeated for each method that needs to be modified. In step 302 of FIG. 6, the system accesses the beginning of the byte code for a particular method. In one implementation, step 302 includes accessing the first element in the code array of the code attribute of the method info structure. In step 304, the indices for the byte code are adjusted. That is, the system knows it needs to add the start code and knows how many bytes the start code occupies. These bytes will eventually be added to the top of the array. Therefore, the remaining instructions need to be moved (change index) to make room for the new instructions. If the start code needs 8 bytes, then the indices for the original code needs to be adjusted to reflect the displacement by 8 bytes. Additionally, all references to byte code within an instruction must also be adjusted; for example, the pointer reference for a jump or branch instruction must be adjusted. In step 306, the new start code is added to the code array. As discussed above, the example discussed herein is using Java byte code. Thus, step 306 includes adding new Java byte code to the beginning of the code array. In step 308, the system accesses the end of the byte code, which in one embodiment is the end of the code array. In step 310, the new exit byte code is added at the end of the code array. In some embodiments, a portion of the exit byte code is added at other points in the code array. Additionally, other alternatives include adding the exit byte code at locations other than the end of the byte code.

In step 312 of FIG. 6, the exception table is adjusted. That is, because the indices of the byte codes changed, the values of start_pc, end_pc and handler_pc may need change for existing exception handlers. Each entry in the exception table indicates a range of code in the code array that pertain to the particular exception handler. Because the code indices were shifted, the indices in the exception table must also shift accordingly. If the location of the exception handler code moved in the code array, then handler_pc must also change accordingly. Step 312 can also include adjusting other tables in the class file, as appropriate to the particular implementation.

In step 314, a new entry is added to the exception table. This new entry correlates to the new "finally" block. The new entry has a catch_type of zero, indicating it is for all exceptions. Additionally, the new entry in the exceptions table will be added to the end of the exceptions table. The start_pc and end_pc for the new entry is set to include the original Java byte code for the method being instrumented. The value of the handler_pc for the new entry would point to the new byte code added in step 310.

Figure 7:
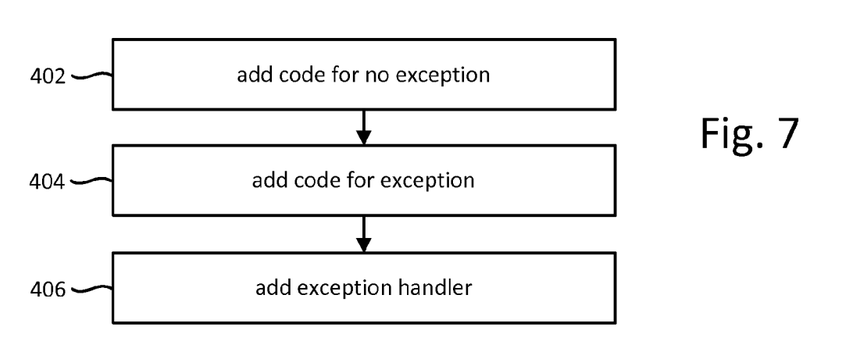
FIG. 7 is a flow chart describing one embodiment of the process of adding new exit byte code.

FIG. 7 is a flowchart describing more detail of the process of adding new exit byte code (step 310 of FIG. 6). In step 402, new code is added to the code array to account for the situation where there is no exception. That is, the original Java method instructions are performed without any exceptions. After the original instructions are performed, the new exception handler code must be executed. The original code is instrumented to include a jump to the byte code for the exception handler corresponding to the "finally" block. In step 404, new byte code is added to the code array that accounts for the situation when there are exceptions. In step 406, the code for the exception handler is added.

To better understand the present invention, an example is provided. This example explains one embodiment for performing the present invention. Described above is example pseudo code for "exampleMethod." Below is the pseudo object code (converted to a human readable form) for exampleMethod (which does not have an exceptions table):

Max stack size: 2
Max local variables: 2
Code size: 4
   0 iload_1
   1 iconst_1
   2 iadd
   3 ireturn The pseudo object code for exampleMethod includes four instructions. The first instruction (iload_1) pushes the parameter x onto the stack. The second instruction (iconst_1) pushes a constant (1) onto the stack. The third instruction (iadd) adds the top two quantities on the stack. The fourth instruction returns whatever is on top of the stack, which in this case is the sum from the previous instruction. The code above is an example of the existing object code that would be an input to code modifier 10. In one example, code modifier 10 modifies this existing object code as follows:

Max stack size: 9
Max local variables: 6
Code size: 48
   0 ldc #42<String "com.wily.introscope.agent.trace.MethodTimer">
   2 aload_0
   3 ldc #56<String "com.wily.example.ExampleApp">
   5 ldc #58<String "exampleMethod">
   7 ldc #60<String "name=Example Stat">
   9 invokestatic #48<Method com.wily.introscope.agent.trace.IMethodTracer com.wily.introscope.agent.trace.AMethodTracer.load Tracer(java.lang.String, java.lang.Object, java.lang.String, java.lang.String, java.lang.String)>
  12 astore 4
  14 nop
  15 nop
  16 iload_1
  17 iconst_1
  18 iadd
  19 istore 5
  21 jsr 36
  24 iload 5
  26 nop
  27 ireturn
  28 astore_3
  29 jsr 36
  32 aload_3
  33 athrow
  34 nop
  35 nop
  36 astore_2
  37 aload 4
  39 invokeinterface (args 1) #54
     <InterfaceMethod
     void IMethodTracer_finishTrace( )>
  44 ret 2
  46 nop
  47 nop

| Exception Table | | | |
| --- | --- | --- | --- |
| star_pc | end_pc | handler_pc | catch_type |
| 16 | 28 | 28 | 0 |

Code modifier 10 modified the original object code to add start code and exit code. The first section of the modified code, identified by indices 0-15, corresponds to the source code "IMethodTracer tracer=AMethodTracer.loadTracer( . . . parameter . . . )." These byte codes push the parameters, call AMethodTracer.loadTracer, and store the result in a local variable. The nops at the end are just to make coding easier. In one embodiment, the longest sequence needed to generate is 16 bytes long. In one implementation, the code modifier always adds 16 bytes. Sometimes not all 16 bytes are used, so the code is padded with nops.

Section two of the modified code corresponds to instructions with indices 16, 17 and 18. These three instructions correspond to existing object code for implementing "x=x+1."

The third section of the modified code corresponds to instructions from indices 19-27, and is performed in the case where there is no exceptions. This code calls the "finally handler." Basically, the code of the third section sets aside the computed value (puts it into a temporary, here, local number 5). The code then jumps to the finally handler (jsr 36). When control returns back from the finally handler, the code gets the answer out of local number 5 and puts it back on the stack. Then, it returns.

Section four corresponds to code with indices 28-35. This is the "catch all exceptions" handler. Any exceptions not otherwise handled would jump to this code. This code jumps to the "finally handler" (jsr 36). This sequence of instructions saves the pending exception object, jumps to the "finally handler," restores the pending exception object, and then re-throws the pending exception object.

Section five of the code, corresponding to indices 36-47, represents the "finally handler" itself. This code stores its own return address, loads the tracer out of local 4 (where it put it back at index 12), calls the finish trace handler, and returns back to where it came from.

The example above also includes an exception table which has one entry. This entry indicates that for code between indices 16 and 28, if there is any type of exception go to the handler starting at index 28. Note that instruction 28 is the "catch all exceptions handler" described above.

Note that ranges of instructions protected by two different exception handlers always are either completely disjoint, or else one is a subrange of the other. If there are multiple entries in the exception table, the first, innermost, applicable exception handler in the exception table is chosen to handle the exception. The code for that exception handler performs its intended function and then makes a subroutine call to the "finally handler."

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for monitoring, comprising:
accessing a set of instructions;
determining, automatically, whether the set of instructions satisfies two criteria from the group of criteria:
   i) the set of instructions is not synthetic, wherein a synthetic set of instructions are ones that are generated by a compiler;
   ii) the set of instructions calls another set of instructions; or
   iii) the set of instructions has an access level that satisfies a condition, wherein the access level is an access control level of a method that is provided by a programming language;
instrumenting the set of instructions if the set of instructions satisfies the two criteria; and
determining that the set of instructions should not be instrumented if the set of instructions does not satisfy the two criteria.

2. The method of claim 1, wherein the instrumenting the set of instructions comprises adding a tracer to the set of instructions.

3. The method of claim 1, wherein the determining, automatically, whether the set of instructions satisfies two criteria from the group of criteria comprises determining whether the set of instructions has an access level that satisfies a condition, which comprises determining a level of access control for the set of instructions that is provided by a programming language.

4. The method of claim 3, wherein the determining a level of access control for the set of instructions that is provided by a programming language comprises determining whether the set of instructions has an access level of either public or package.

5. The method of claim 1, wherein the determining, automatically, whether the set of instructions satisfies two criteria from the group of criteria comprises determining whether the set of instructions is not synthetic, which comprises determining that the set of instructions is synthetic if the set of instructions is compiler generated.

6. The method of claim 1, wherein the determining, automatically, whether the set of instructions satisfies two criteria from the group of criteria comprises determining whether the set of instructions satisfies the criterion ii) the set of instructions calls another set of instructions, and the criterion iii) the set of instructions has an access level that satisfies a criterion.

7. The method of claim 1, wherein the determining, automatically, whether the set of instructions satisfies two criteria from the group of criteria comprises determining whether the set of instructions satisfies all three of the criteria.

8. The method of claim 1, wherein the set of instructions comprises a procedure, function, routine, subroutine, sequence, process or method.

9. A system comprising:
a processor configured to:
access a set of instructions;
determine whether the set of instructions satisfies two criteria from the group of criteria:
   i) the set of instructions is not synthetic, wherein a synthetic set of instructions are ones that are generated by a compiler;
   ii) the set of instructions calls another set of instructions; or
   iii) the set of instructions has an access level that satisfies a condition, wherein the access level is an access control level of a method that is defined by a programming language; and
instrument the set of instructions if the set of instructions satisfies the two criteria; and
determine that the set of instructions should not be instrumented if the set of instructions fails to satisfy the two criteria.

10. The system of claim 9, wherein the processor being configured to instrument the set of instructions comprises the processor being configured to add a tracer to the set of instructions.

11. The system of claim 9, wherein the processor being configured to determine whether the set of instructions satisfies two criteria from the group of criteria comprises the processor being configured to determine whether the set of instructions has an access level that satisfies a condition, which comprises the processor being configured to determine a level of access control for the set of instructions that is defined by a programming language.

12. The system of claim 9, wherein the processor being configured to determine whether the set of instructions satisfies two criteria from the group of criteria comprises the processor being configured to determine whether the set of instructions is not synthetic, which comprises the processor being configured to determine that the set of instructions is synthetic if the set of instructions is a compiler generated method.

13. The system of claim 9, wherein the processor being configured to determine whether the set of instructions satisfies two criteria from the group of criteria comprises the processor being configured to determine whether the set of instructions satisfies the criterion ii) the set of instructions calls another set of instructions, and the criterion iii) the set of instructions has an access level that satisfies a criterion.

14. The system of claim 9, wherein the processor being configured to determine whether the set of instructions satisfies two criteria from the group of criteria comprises the processor being configured determine whether the set of instructions satisfies all three of the criteria.

15. The system of claim 9, wherein the set of instructions comprises a procedure, function, routine, subroutine, sequence, process or method.

16. A non-transitory processor readable storage device having processor readable code embodied thereon, the processor readable code for programming a processor to:
access a set of instructions;
determine whether the set of instructions satisfies two or more criteria from the group of criteria:
   i) the set of instructions is not synthetic, a synthetic set of instructions is one that is a compiler generated;
   ii) the set of instructions calls another set of instructions; or iii) the set of instructions has an access level that satisfies a condition, wherein the access level is an access control level of a method that is provided by a programming language; and instrument the set of instructions only if the set of instructions satisfies the two or more criteria.

17. The non-transitory processor readable storage device of claim 16, wherein the processor readable code for programming the processor to instrument the set of instructions comprises the processor readable code for programming the processor to add a tracer to the set of instructions.

18. The non-transitory processor readable storage device of claim 16, wherein the processor readable code for programming the processor to determine whether the set of instructions satisfies two or more criteria from the group of criteria comprises processor readable code for programming the processor to determine whether the set of instructions has an access level that satisfies a condition, which comprises processor readable code for programming the processor to determine a level of access control for the set of instructions that is provided by a programming language.

19. The non-transitory processor readable storage device of claim 16, wherein the processor readable code for programming the processor to determine whether the set of instructions satisfies two or more criteria from the group of criteria comprises processor readable code for programming the processor to determine whether the set of instructions satisfies the criterion ii) the set of instructions calls another set of instructions, and the criterion iii) the set of instructions has an access level that satisfies a condition.

20. The non-transitory processor readable storage device of claim 16, wherein the set of instructions comprises a procedure, function, routine, subroutine, sequence, process or method.

\* \* \* \* \*